(12) United States Patent
Schneider et al.

(10) Patent No.: US 6,356,243 B1
(45) Date of Patent: Mar. 12, 2002

(54) THREE-DIMENSIONAL GEOMETRIC SPACE LOOP ANTENNA

(75) Inventors: Gerhard Schneider, Mex; Philippe Junod, Romanel-sur-Morges, both of (CH)

(73) Assignee: Logitech Europe S.A. (CH)

( * ) Notice: Subject to any disclaimer, the term of this patent is extended or adjusted under 35 U.S.C. 154(b) by 0 days.

(21) Appl. No.: 09/618,982

(22) Filed: Jul. 19, 2000

(51) Int. Cl.[7] ................................................. H01Q 7/00
(52) U.S. Cl. .................... 343/866; 343/867; 343/765
(58) Field of Search ........................... 343/741, 742, 343/867, 866, 765, 702, 776; H01Q 7/00

(56) References Cited

U.S. PATENT DOCUMENTS 2,818,562 A * 12/1957 Carter .................... 343/742
3,082,421 A * 3/1963 Shyhalla .................. 343/114
3,573,832 A * 4/1971 Callaghan ................. 343/742
5,451,965 A * 9/1995 Matsumoto ................ 343/702
6,043,792 A * 3/2000 Finlayson ................. 343/867
6,166,637 A * 12/2000 Cyr et al. ............... 340/572.7

* cited by examiner

*Primary Examiner*—Tho Phan
*Assistant Examiner*—Trinh Vo Dinh
(74) *Attorney, Agent, or Firm*—Fenwick & West LLP

(57) ABSTRACT

An antenna system includes a first portion and a second portion. The first portion and the second portion form an antenna loop. The first portion may be etched on a printed circuit board. The second portion may be coupled with the first portion or extend from the first portion. The first portion and the second portion each may have one or more turns. Further, the second portion of the antenna loop resides in a three-dimensional geometric space that is different from the first portion of the antenna loop. The antenna system is particularly well suited for electronic devices having a confined internal space, for example, a cordless pointing device, a cordless gaining device, or a cordless camera device. A method for designing an antenna system is also disclosed.

23 Claims, 5 Drawing Sheets

THREE-DIMENSIONAL GEOMETRIC SPACE LOOP ANTENNA

BACKGROUND OF THE INVENTION

1. Field of the Invention

The present invention relates to antenna systems, and more particularly, to a three-dimensional geometric space loop antenna for use in a confined space.

2. Description of Background Art

In general, the size of an antenna is dependent upon the wavelength and frequency of operation. For example, a one-quarter wavelength antenna operating in the radio frequency range (e.g., 27 MHz) would have a length of approximately 2 to 3 meters. This length of an antenna implicates a minimum amount of physical space that the antenna occupies. As such, various techniques have developed in an effort to reduce the physical space consumed by an antenna One such technique involves simply shortening the length of the antenna conductor so it takes up less physical space. However, the space savings afforded by this technique comes at the cost of decreasing transmission or reception power for the communication signal thereby affecting the transmission range of the antenna. This range limitation problem is particularly so for antennas operating in the radio frequency range (approximately 1 MHz to 1 GHz). As such, this technique is not always desirable or practical. One solution to this limitation on transmission range is to increase signal power to the antenna. Such increased power comes at the cost of system efficiency, though, and may also be undesirable and/or impractical.

Another technique requires a departure from the conventional dipole shape of an antenna. Loop antennas can be circular, square, rectangular or other planar-type shapes. The loop of the antenna can be comprised of a number of turns. These turns are parallel planar to each other. For example, a two turn loop antenna could be etched onto a printed circuit board where the two turns of the loop are on one side of the printed circuit board. As such, a lengthy antenna conductor can therefore be contained in approximately the space of one loop. However, the diameter of the loop still may require a significant amount of physical space. This reduces the space available for electronic components necessary for the functionality of the transmitting/receiving device (e.g., a wireless (or cordless) mouse or keyboard). Decreasing the size of the loop diameter will decrease the transmitted or received communication signal power. As such, less signal voltage is presented to the receiving device. A significant size limitation, therefore, still exists for such antennas.

Other known antennas suffer from similar problems. For instance, the helical or spiral antennas compact the length of an antenna conductor into a series of parallel planar turns, where each of the turns in this series exists about a common axis. Thus, the physical space reduction afforded by antennas such as the loop, helical, spiral, and dipole antennas is limited in part based on the inherent uniformity that exists in these antenna designs, as well as antenna performance criteria.

In direct conflict with this inherent space limitation of conventional antenna designs is a growing desire for ergonomic housing designs that are more sleek and compact in form, such as in wireless mice. Within such ergonomically designed wireless devices, there is a smaller printed circuit board. This results in a reduction of the overall usable space on the printed circuit board, which in turn reduces the space that is available for the etched loop antenna having a length and turns sufficient to provide acceptable antenna range and performance.

Therefore, there is a need for an antenna design that provides high quality transmission and reception performance characteristics, wherein the antenna design can be efficiently implemented in a limited amount of physical space.

SUMMARY OF THE INVENTION(S)

The present invention includes an antenna system having an antenna loop of which a portion of the antenna loop is configured in a different three-dimensional geometric space than another portion or portions of the antenna loop. In one-embodiment, the antenna loop is configured to provide good communication signal transmission and reception characteristics within a small (or confined) internal space in which a large antenna is unwieldy and undesirable. For example, the antenna loop may be housed within a small form factor cordless electronic device, such as a cordless pointing device or a universal control device, where surface area and volume are constrained by size and ergonomic constraints.

An advantage of the present invention is that it provides a flexible antenna loop in which the overall size (length) of the antenna is increased by moving a portion of the antenna loop into another space of a three-dimensional geometric space. For example, an antenna loop may have more than one portion, each of which is coupled together to form a single antenna loop having a larger length than, for example, conventional two-dimensional antenna loops. Increasing the length of the antenna loop enhances the quality of communication signals that are transmitted or received by the antenna system. The increase in the length of the antenna loop allows the antenna system to be used in small space or volume devices in which lower frequency ranges, for example, the below approximately 100 MHz range, are desired. The use of lower frequency ranges in such devices provides additional advantages such as decreased electronic circuit complexity.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

Reference will now be made in detail below to several embodiments of the present invention, examples of which are illustrated in the accompanying drawings. The drawings are provided for illustrative purposes only and not to limit the scope of the claims below.

Figure (or FIG.) 1A is a system-level diagram of one embodiment of a data processing system having one or more cordless devices that include an antenna system in accordance with the present invention.

DETAILED DESCRIPTION OF THE PREFERRED EMBODIMENTS

Figure 1A:
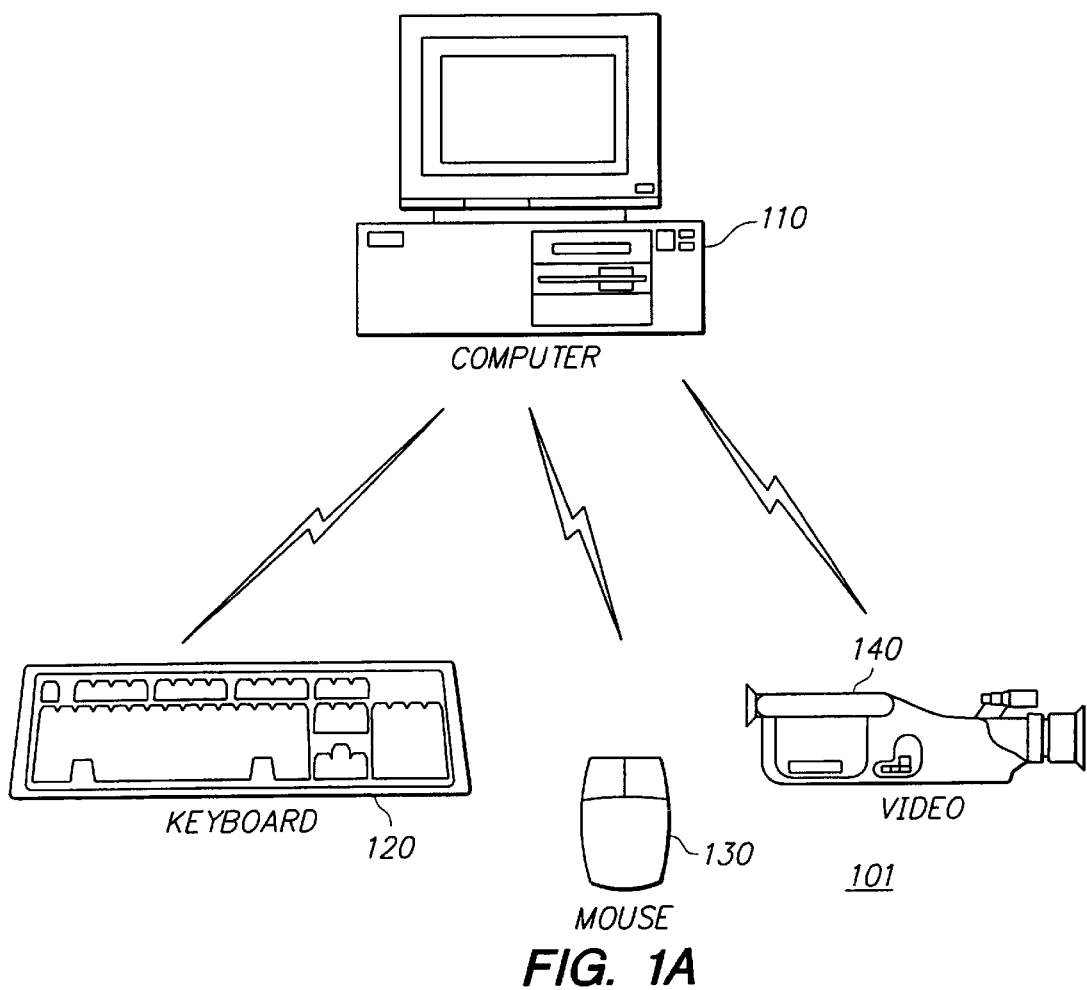
FIG. 1B is a block diagram of one embodiment of components of a computer and a cordless device in wireless communication in accordance with the present invention.

The figures (or drawings) depict a preferred embodiment of the present invention for purposes of illustration only. It is noted that similar or like reference numbers in the figures may indicate similar or like functionality. One of skill in the art will readily recognize from the following discussion that alternative embodiments of the structures and methods disclosed herein may be employed without departing from the principles of the invention(s) herein.

The present invention includes an antenna system having an antenna loop of which a portion (or one or more turns) of the antenna loop is configured in a different three-dimensional geometric space than another portion or portions of the antenna loop. In one embodiment, the antenna loop is configured to provide good communication signal transmission and reception characteristics within a small (or confined) internal space in which a large antenna is unwieldy and undesirable. For example, the antenna loop may be housed within a small form factor cordless electronic device, such as a cordless pointing device or a universal control device, where surface area and volume may be constrained by, for example, housing size and ergonomic design constraints.

Figure (or FIG.) 1A is a system-level diagram of one embodiment of a data processing system 101 having one or more cordless (or wireless) electronic peripheral devices that include an antenna system in accordance with the present invention. The one or more peripheral devices may communicate with a central electronic device (e.g., a host computer) or with one another. In one embodiment, the data processing system 101 may include a computer 110 that communicatively couples with one or more cordless peripheral devices.

The computer 110 may be a conventional intelligent device, for example, a personal computer, a personal digital assistant, a set-top box, or the like. The peripheral devices may include control devices, for example, a keyboard 120, a mouse 130, a trackball, or a touch pad. The peripheral devices may also include image devices, for example, a video camera 140 or a scanning device. Other peripheral devices include, for example, a gaming device (e.g., a cordless driving wheel, joystick, or game controller) or an entertainment device (e.g., a cordless speaker).

It is noted that the electronic devices, particularly the peripheral devices, have relatively small form factors. For example, the mouse 130 may have dimensions of approximately 8 to 12 centimeters by 4 to 6 centimeters by 3 to 6 centimeters. The joystick may have dimensions of approximately 8 to 14 centimeters by 5 to 10 centimeters by 3 to 6 centimeters. The video camera 140 may have dimensions of, for example, approximately 3 to 8 centimeters by 3 to 8 centimeters by 3 to 8 centimeters. In turn, generally this means that the peripheral electronic devices have relatively confmed (or small) footprint areas and/or small volume areas.

Figure 1B:
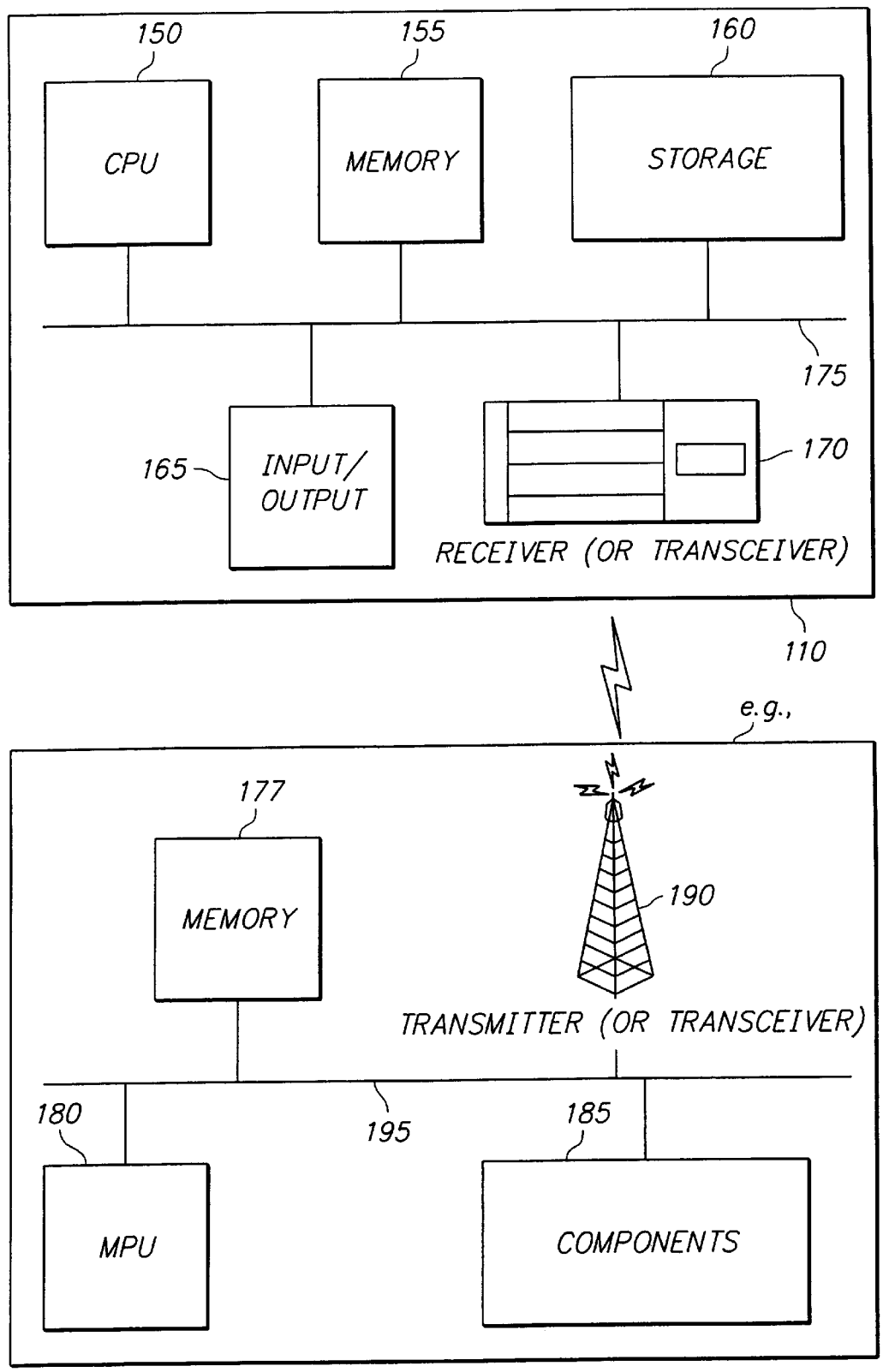

FIG. 1B is a block diagram of one embodiment of components of a computer 110 and a cordless device, e.g., the mouse 130, in wireless communication in accordance with the present invention. The cordless device may be used to control aspects of the computer 110 and/or send data to the computer 110, similar to a conventional pointing device, a conventional gaming device, or a conventional video device.

In one embodiment, the computer 110 includes a central processing unit (CPU) 150, a memory 155, an optional storage device 160, an optional input/output port 165 and a receiver 170. Optionally, the receiver 170 may be a transceiver that is capable of receiving and transmitting communication signals. The CPU 150, the memory 155, the storage device 160, the input/output port 165, and the receiver 170 are coupled through a data bus 175.

In one embodiment the CPU 150 is a conventional processor, for example, an Intel (Santa Clara, Calif.) Pentium-type processor or a Motorola (Schaumburg, Ill.) PowerPC-type processor. The memory 155 is a conventional memory, for example, a dynamic random access memory or a static random access memory. The storage device 160 is a conventional storage device, for example, a magnetic disk storage device, an optical disk storage device, a tape storage device, or a solid state (e.g., flash memory) storage device. The data bus 175 is a conventional data bus, for example, a system bus or a peripheral component interconnect bus. The receiver 170 (or transceiver) is a conventional receiver (or transceiver) device.

The cordless device is, for example, a control or pointing device. This can include the mouse 130, the video camera 140, the joystick, the drive wheel, or a remote control device. For purposes of illustration only, in FIG. 1B one embodiment of the mouse 130 will be described with an understanding that the concepts described herein are applicable to other cordless devices such as those listed above. The mouse 130, includes a memory 177, a microcontroller processing unit (or MPU) 180, and a transmitter 190.

It is noted that the memory 177 may be incorporated within the MPU 180. Optionally, the transmitter 190 may be a transceiver that is capable of transmitting or receiving communication signals. The mouse 130 may optionally include components 185, for example, an optical laser and detection module. The memory 177, the MPU 180, the components 185 and the transmitter 190 couple through an electrical signal line 195, which may be a type of data bus. In addition, it is noted that the mouse 130 also includes a power source (not shown) to supply power to the appropriate components, for example, the MPU 180 or the transmitter 190.

In one embodiment, the memory 177 is a conventional memory, for example, a dynamic or static random access memory or a flash memory. The MPU 180 is a conventional MPU, for example a Motorola 6805 or 6808 families of MPUs. The transmitter (or transceiver) 190 is a conventional transmitter (or transceiver). The components may be conventional components, for example, an optical module assembly from Hewlett-Packard Inc. (Palo Alto, Calif.).

Generally, the computer 110 and the control device, e.g., the mouse 130, are communicatively coupled through the receiver 170 and the transmitter 190 (or the respective transceivers). For example, the mouse 130 sends data to the computer 110 using a conventional wireless protocol. More particularly, the transmitter 190 couples with an antenna system through which the wireless protocol is sent via a communication signal to an antenna that couples with the receiver at the computer 110. The communication signal may be a radio frequency signal operating in a wide range of frequencies, for example, in the 10 MHz to 100 MHz range.

Figure 2A:
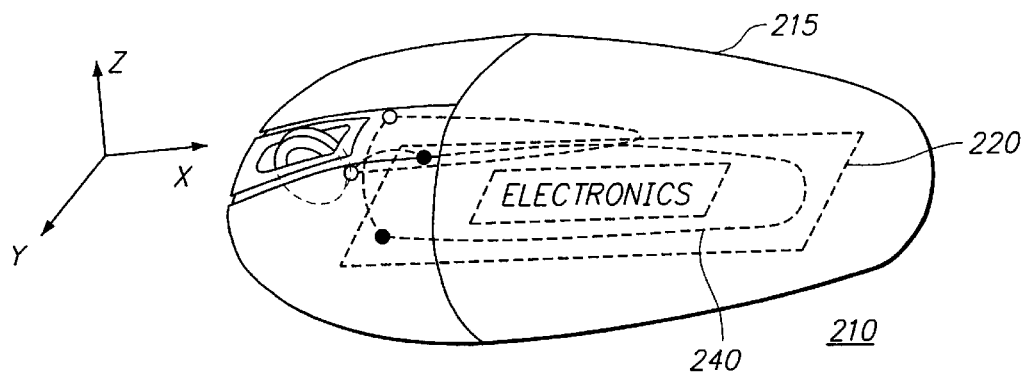
FIG. 2A is a diagram of a first embodiment of an internal view of a cordless device in accordance with the present invention.

Turning now to FIG. 2A, there is shown a diagram of a first embodiment of an internal view of a cordless (e.g., peripheral) device 210 in accordance with the present invention. The cordless device 210 may be a cordless mouse that may be functionally similar to the mouse 130 with regard to control functions performed in conjunction with the computer 110. The cordless device 210 includes a housing 215 and an electronics (or printed) circuit board 220.

The housing 215 creates a relatively small internal space that is confined with respect to area and volume. Typically, the electronics circuit board 220 resides within the housing in a Cartesian plane (e.g., an x-plane, y-plane, or z-plane) having the greatest dimensions. It is noted that in one embodiment the dimensions of the internal volume within the housing is, for example, approximately 6 to 10 centimeters by 2 to 5 centimeters by 2 to 4 centimeters. An alternative embodiment of the first embodiment of an internal view of a cordless peripheral device 212 is illustrated in FIG. 2C. In this embodiment, the perimeter of the electronics circuit board 220 may be smaller than the perimeter of a second portion 240b of the antenna. This second portion 240b of the antenna is in a separate three-dimensional plane than the electronics circuit board 220.

Figure 2B:
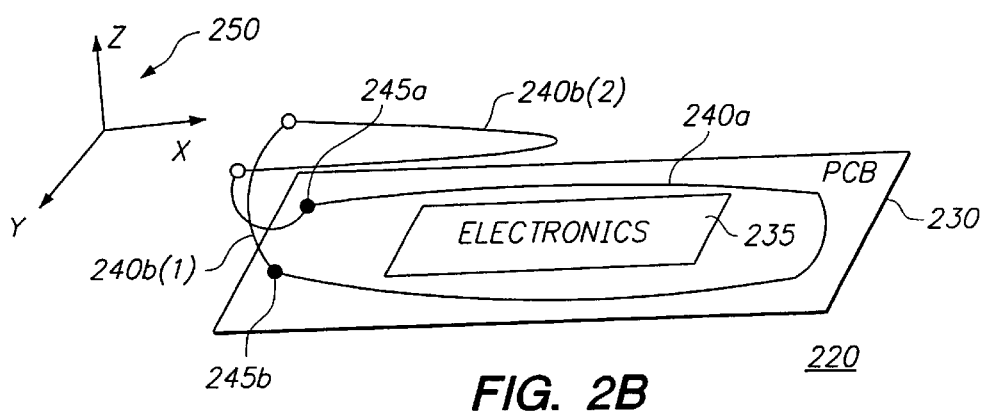
FIG. 2B is a layout diagram of the first embodiment of an electronics circuit board with a first embodiment of an antenna system in accordance with the present invention.
Figure 2C:
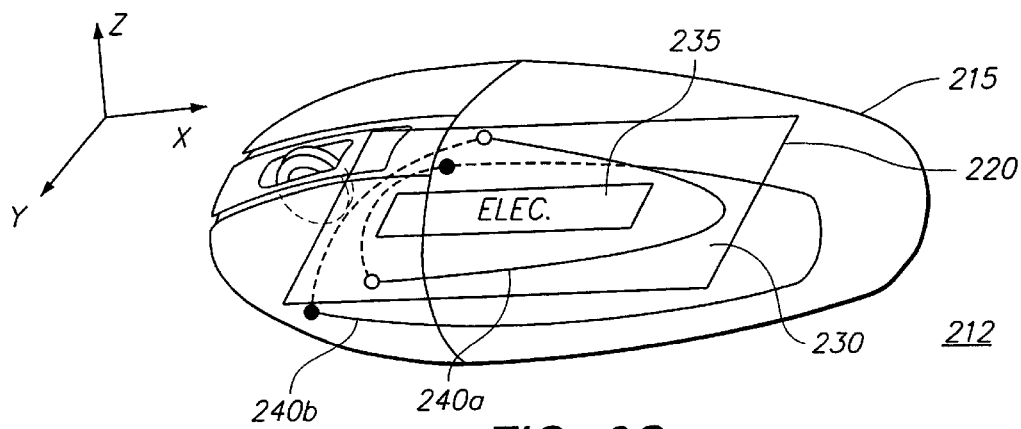
FIG. 2C is a diagram of an alternative embodiment of the first embodiment of the internal view of a cordless device in accordance with the present invention.

FIG. 2B is a diagram of the electronics circuit board 220 and a first embodiment of an antenna system (generally 240) in accordance with the present invention. The electronics circuit board 220 may be, or includes, a printed circuit board (or printed circuit card) 230. The printed circuit board 230 includes some functional electronics 235 for the peripheral device, and at least a portion (e.g., a first portion) of the antenna system 240a.

Another (e.g., a second) portion of the antenna system 240b(1), 240b(2) (generally 240b) does not reside on the electronics circuit board 240. However, the second portion of the antenna system 240b(1), 240b(2) couples with the first portion of the antenna system 240a (e.g., respectively at 245b and 245a) to logically form a single antenna. Note that the second portion 240b may be one or more portions (hence the example with reference numbers 240b(1), 240b(2)). However, when connected with the other portions they function to form a uniform antenna. This uniform logical antenna is an antenna loop.

In one embodiment, the first portion 240a of the antenna system may be formed as a metallic trace on the printed circuit board 230. The metallic trace may be printed (or etched, or placed) on the printed circuit board 230. To help increase the length of the antenna loop, the metallic trace is extended as far as possible along the edge of the printed circuit board 230. The second portion 240b of the antenna system may be an antenna wire. The antenna wire may be a conventional antenna wire having good signal communication transmission and reception characteristics. For example, the antenna wire may be a copper or copper-plated wire. Alternatively, the antenna wire may be a wire constructed of a steel core that is surrounded by copper and by tin.

Generally, in one embodiment the printed circuit board 230 may have a perimeter length (or size) of, for example, approximately 15 to 24 centimeters (based on, for example, a 6 to 9 centimeter by 3 to 6 centimeter printed circuit board dimensions). Further, the length of the antenna wire along the perimeter of the printed circuit board 230 may be, for example, approximately 6 to 9 centimeters by 2 to 5 centimeters.

In one embodiment the second portion 240b couples with the first portion 240a at one or more contact points 245a, 245b (generally 245). The contact points 245 may be conventional solder points. From the contact points 245, the second portion 240b may be configured to extend into a separate geometric plane than the first portion 240a of the antenna system. This forms an antenna loop within a three-dimensional Cartesian coordinate geometric space, e.g., 250. Moreover, to increase the length of the antenna loop, the second portion 240b can be further configured so that it is substantially in a separate three-dimensional plane than the first portion 240a, for example, substantially parallel (e.g. 240b(2)) to the first portion 240a so that generally the antenna loop is in an x-plane, a y-plane, and a z-plane.

Hence, an advantage of the present invention is that the antenna loop of the antenna system is no longer confined to a single two-dimensional plane, for example, the x-y Cartesian coordinate plane of the printed circuit board 230, but rather is expanded out into the three-dimensional space to cover the x-, y-, and z-axis Cartesian coordinates. The resulting increase in the overall length of the antenna loop further increases the transmission and reception quality for a communication signal, particularly for communication signals that are below the 100 MHz frequency range.

The present invention also provides flexible design advantages for environment with higher degrees of electrical interference or sensitivity. For example, in some receiver environments using Universal Serial Bus ("USB") specifications, conventional antenna loop designs using an etched loop around USB electronics, may cause excessive RF signal reception interferences (or disturbances) that result in RF signal degradation or loss. The present invention includes a manufacturing and design technique that provides an antenna loop in a three-dimensional geometric space that beneficially increases the length of the antenna loop while reducing the effects of interference causing electronics.

Figure 3A:
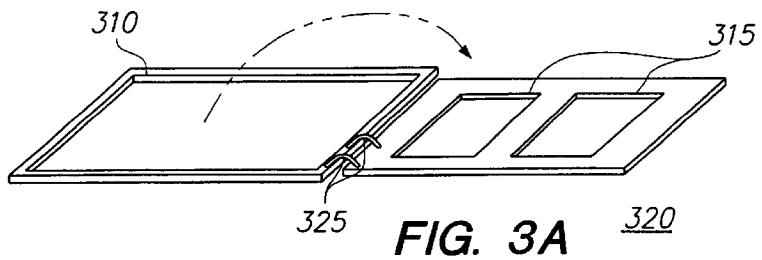
FIG. 3A is a diagram of a second embodiment of an antenna system in accordance with the present invention.

FIG. 3A is a diagram of a second embodiment of an antenna system in accordance with the present invention. Generally, in one embodiment, a printed circuit board (or card) 320 may be manufactured to include an antenna 310 and electronic components 315. The printed circuit board 320 is made from a conventional plastic or resin material. In one embodiment, the printed circuit board 320 is configured so that it may be housed within an electronic device having a small, confined volume. For example, the printed circuit board 320 may be 4 to 10 centimeters in length by 2 to 8 centimeters in width by a few millimeters to 4 centimeters in height. This configuration could be housed in relatively small cordless devices, for example, a pointing device, a control device, or a communication device. Alternatively, this configuration is suited for use with a cordless device base station that may include a receiver or transceiver device that couples with a computer, for example, the computer 110. The cordless device base station may have a small internal space that measures, for example, 4 to 10 centimeters in length and width and 1 to 4 centimeters in height.

The electronic components 315 may be conventional electronic components that are capable of performing at least one of a variety of electronic functions. For example, the electronic components 315 may include USB-type receiver or transceiver electronics that receive and/or generate radio-frequency ("RF") signals. In another example, the electronic components 315 may include control device processing electronics to translate mechanical actions on the mouse into corresponding electrical signal for interaction with the computer 110. These electrical signals may then be transmitted to a reciprocal device using RF signals. The antenna 310 receives and/or transmits the RF signals. The electronic components 315 couple with the antenna through a wire or other signal communication component 325, for example, an electrical connector.

The electronic components 315 may be configured within an interior of the printed circuit board ("PCB") 320. The antenna 310 may be configured so that it is printed (or etched or placed) at or substantially proximate each outer edge of the printed circuit board 320. In this configuration, the antenna 310 forms an antenna loop. In one embodiment, the printed circuit board 320 is manufactured so that a thin area that includes the antenna 310 is substantially cut (or scored) close to the outer edges. In one embodiment, the thin area is, for example, approximately 1 millimeter to 1 centimeter is width as measured from the outer edge to the inner edge of that thin area. Cutting the printed circuit board 320 in this manner allows for a portion of the printed circuit board 320 having the antenna to be substantially separated (or parted or "opened") away from the electronic components 315 that may cause RF signal interferences with regard to the antenna 310 when the electrical components 315 are operational.

An advantage of the design of the printed circuit board 320 is that it allows for incorporating an antenna 310 and electronic components 315 on the printed circuit board 320 in one general manufacturing process. Another advantage is that the printed circuit board 320 can be appropriately separated into a portion having the antenna 310 and a portion having the electronic components. Thus, the same initial printed circuit board 320 may be used to manufacture both components, which helps increase manufacturing yield from an initial printed circuit board, reduce waste from the manufacturing process, and in turn, helps to reduce per unit manufacturing costs.

Figure 3B:
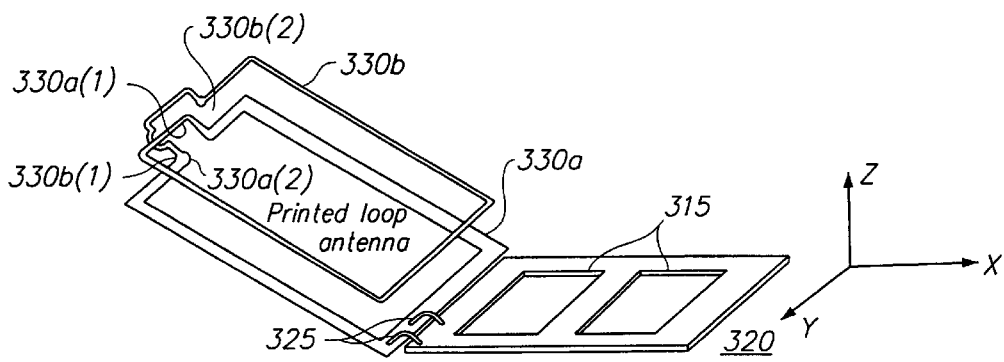
FIG. 3B is a diagram of the second embodiment of the antenna system within a second embodiment of a cordless device having a confined space in accordance with the present invention.

FIG. 3B is a diagram of the second embodiment of an antenna system in accordance with the present invention. The printed circuit board 320 includes the electronic components 315 and includes an antenna (generally 330). The antenna 330 is functionally similar to the antenna 310 described above. In this embodiment, the antenna 330 includes a first portion 330*a* and a second portion 330*b*. The first portion 330*a* may be initially printed on the printed circuit board 320. This section will then be separated from the reminder of the printed circuit board 320 as described above. The second portion 330*b* may be an antenna wire, for example, similar to the antenna wire described above.

The first portion 330*a* of the antenna includes a first end 330*a*(1) and a second end 330*a*(2). The second portion 330*b* of the antenna also includes a first end 330*b*(1) and a second end 330*b*(2). In one embodiment, the first end 330*a*(1) of the first portion 330*a* couples with the second end 330*b*(2) of the second portion 330*b* and the second end 330*a*(2) of the first portion 330*a* couples with the first end 330*b*(1) of the second portion 330*b* of the antenna. It is noted that the couplings may also be configured in a variety of other manners, for example, vice versa. The second portion 330*b* of the antenna is configured to be in a different Cartesian coordinate plane than the first portion 330*a* of the antenna. For example, the second portion 330*b* may be located in substantially the same x-plane and y-plane as the first portion 330*a*, but may be in a different z-plane than the first portion 330*a* of the antenna. It is noted that although the antenna 330 may include two (or more) portions, it may logically function as a single antenna.

An advantage of the present invention is that it provides a flexible antenna loop in which the overall size (length) of the antenna is increased by moving a portion of the antenna loop into another space of a three-dimensional Cartesian geometric space. For example, extending first portion 330*a* of the antenna with the second portion 330*b* of the antenna increases the length of the antenna loop. Moreover, adding additional turns to the antenna loop also increases the length (or size) of the antenna loop. For example, the second portion 330*b* of the antenna may include two or more turns that increase the antenna area, which helps to increase signal reception and transmission quality.

The present invention is advantageous for a device operating in, for example, the below approximately 100 MHz range and which only have a small area or volume space in which to configure an antenna. In turn, because the present invention allows use of lower frequencies in such confined devices, there are additional benefits that include decreased power consumption and reduced electrical circuit complexity. These benefits further provide cost savings to develop and manufacture such devices.

Figure 4A:
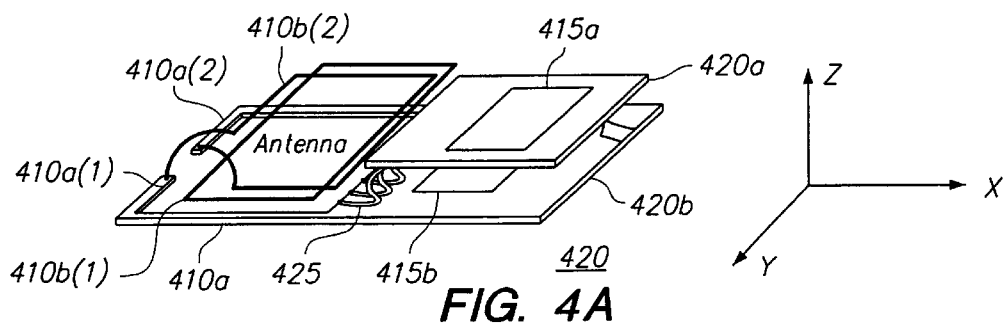
FIG. 4A is a diagram of a third embodiment of an antenna system in accordance with the present invention.

FIG. 4A is a diagram of a third embodiment of an antenna system in accordance with the present invention. Generally, a printed circuit board (or card) (generally 420) includes electronic components (generally 415) and an antenna (generally 410). The printed circuit board 420 is made from a conventional plastic or resin material. As with the printed circuit board 320 described above, this printed circuit board 420 having the antenna system may also be configured so that it may be housed within a variety of housings of different shapes and sizes, including within an electronic device having a small, confined volume. For example, the printed circuit board 420 with the antenna system is suited for use with a receiver or transceiver device that couples with a computer, for example, the computer 110, for communicatively coupling (e.g. RF signal communication) with a cordless peripheral device.

In this embodiment, the printed circuit board 420 may be manufactured so that a portion 420*a* of it is scored (or cut away). The scored portion 420*a* of the printed circuit board allows that portion 420*a* of the printed circuit board to be mounted above the remaining portion 420*b* of it. In one embodiment, the scored portion 420*a* and the remaining portion 420*b* include the electronic components 415. A first set of electronic components 415*a* may be configured on a top and/or bottom surface of the scored portion 420*a*. Further, the scored portion 420*a* is mounted above (or substantially "piggy-backed") the region of the remaining portion 420*b* that may include a second set of electronic components 415*b*. Electrical wires or connectors 425 couple the electrical components 415*a*, 415*b* and may also couple with the antenna 410.

The scored portion 420a of the printed circuit board substantially parts (or "opens") that portion 420a of the printed circuit board 420 from its remainder. Further, the printed circuit board 420 is scored in a manner that leaves a thin area (e.g., approximately 1 millimeter to 1 centimeter in width) close to the outer edges of the printed circuit board 420. This thin area is where a first portion 410a of the antenna is configured. The first portion 410a of the antenna may be printed (or etched or placed) along or within this thin area The antenna 410 includes the first portion 410a and may also include one or more additional portions, e.g., a second portion 410b. The second portion 410b may be an antenna wire, for example, similar to the antenna wire described previously. The first portion 410a of the antenna includes a first end 410a(1) and a second end 410a(2). The second portion 410b of the antenna also includes a first end 410b(1) and a second end 410b(2). In one embodiment, the first end 410a(1) of the first portion 410 couples with the second end 410b(2) of the second portion 410b and the second end 410a(2) of the first portion 410a couples with the first end 410b(1) of the second portion 410b of the antenna. It is noted that in alternative embodiments that a different coupling combinations may be used, for example, vice versa.

The second portion 410b of the antenna is configured to be in a different Cartesian coordinate plane than the first portion 410a of the antenna. For example, the second portion 410b may be located in substantially the same x-plane and y-plane as the first portion 410a, but may be in a different z-plane than the first portion 410a of the antenna. It is noted that although the antenna 410 may include two (or more) portions, it may logically function as a single antenna. Moreover, the second portion 410b of the antenna 410 may include one or more turns in the antenna loop.

Figure 4B:
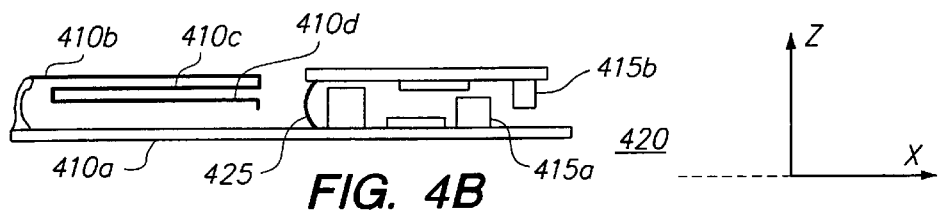
FIG. 4B illustrates a side view of the printed circuit board in accordance with the present invention.

FIG. 4B illustrates a side view of the printed circuit board 420 in accordance with the present invention. In this view, one embodiment of the turns of the portion of the antenna wire off of the printed circuit board 420 are shown as 410b, 410c, and 410d. FIG. 4D illustrates still other embodiment (e.g., fifth) of the present invention in which the printed circuit board 470 has a smaller scored portion (e.g. one-third) that is substantially "piggy-backed" over the remainder of the printed circuit board 470. In this embodiment, the antenna system 410 can be extended in the vertical planes (e.g. the z-plane) to increase the size of the antenna loop despite having a small two-dimensional horizontal plane (e.g., the x-, y-plane) for the initial antenna loop.

Figure 4C:
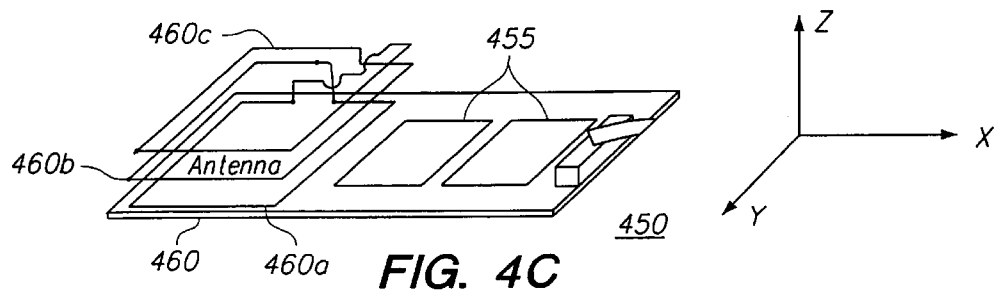
FIG. 4C is a diagram of a fourth embodiment of an antenna system in accordance with the present invention.
Figure 4D:
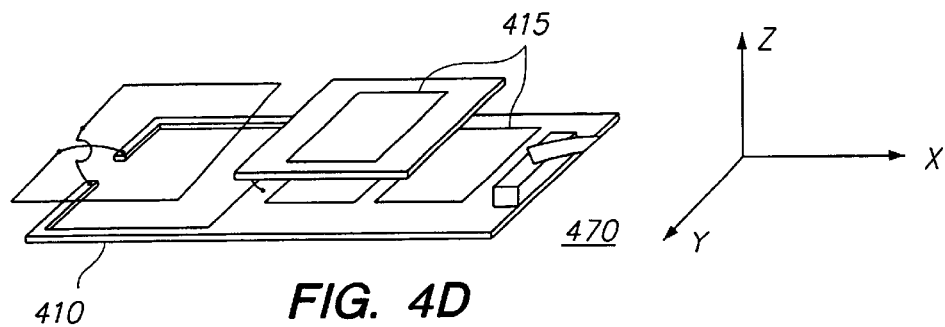
FIG. 4D is a block diagram of a fifth embodiment of an antenna system in accordance with the present invention.

FIG. 4C illustrates a fourth embodiment of the antenna system in accordance with the present invention. In the fourth embodiment a printed circuit board 450 includes electronic components 455 substantially on one portion (e.g., one-half) of it and an antenna (generally 460) on a separate portion (e.g., other half) that is away from the electronic components 455. Generally, the printed circuit board 450 and the electronic components 455 are similar to like components described above. In the fourth embodiment, the antenna 460 is printed on an open portion of the printed circuit board 450. In addition, the antenna may be expanded to include additional portions, e.g., 460b, 460c, that may be additional turns of the antenna loop. These additional portions or turns that are in a separate three-dimensional Cartesian plane (e.g., a z-plane) than the first loop or portion 460a, thereby increasing the length (or size) of the loop antenna.

An advantage of the present invention is that it provides a flexible antenna loop in which the overall size (length) of the antenna is increased by moving a portion of the antenna loop into another space of a three-dimensional Cartesian geometric space (e.g., a separate or different z-plane). Moreover, additional turns may be added to the antenna loop to increase the length of the antenna loop. Increasing the length of the antenna loop beneficially allows for transmission and reception of communication signals below approximately 100 MHz, for example, substantially 27 MHz. Further, the present invention allows the antenna system to be placed away from electronic components that may interfere with signal quality, while retaining an adequate size to ensure acceptable signal transmission and reception capability. Moreover, the present invention is well suited for devices of varying sizes and shapes, particularly those devices having confined (or small) spaces or volumes.

Figure 5:
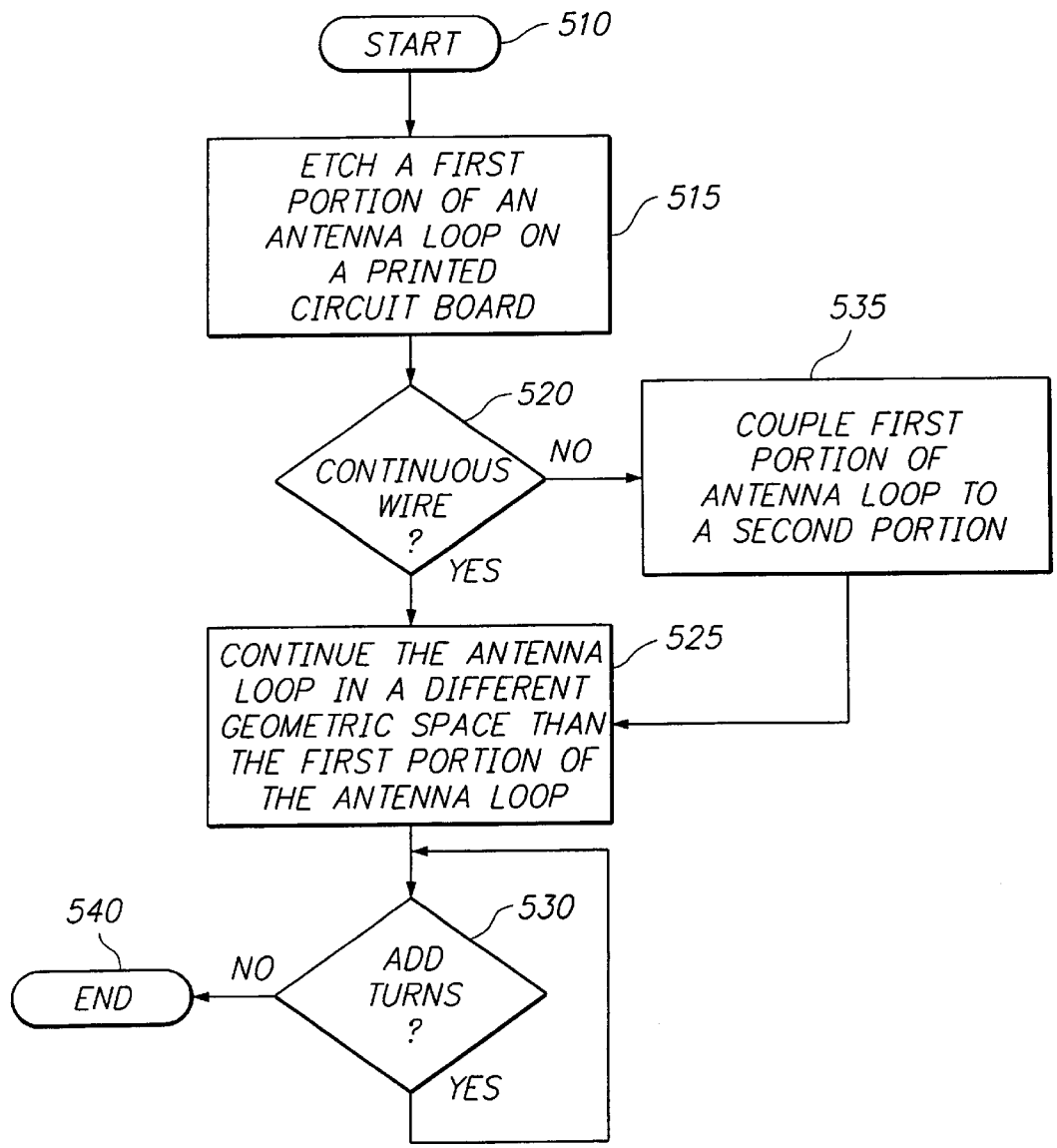
FIG. 5 is a flow diagram of one embodiment of a method for designing an antenna system for use within a device having a confined space in accordance with the present invention.

FIG. 5 is a flow diagram of one embodiment of a method for designing an antenna system for use within a device having a confined space or volume in accordance with the present invention. The process starts 510 with a first portion of an antenna loop coupling with communication electronics and printed (or etched) 515 on a printed circuit board. The process determines 520 if the antenna loop will be a continuous wire. If it is not a continuous wire, the first portion of the antenna loop couples 535 with a second portion of the antenna loop. If it is a continuous wire, or once the portions couple 535 together, the antenna loop itself and/or the second portion of the antenna loop is continued 525 in a different geometric space than the first portion of the antenna loop.

The process then determines 530 whether to add turns to the antenna loop. If so, turns are added to the loop until no more turns are desired. The process then ends 540. It is noted that the step of etching may be replaced or placed later in the process, with the process beginning with, for example, coupling an antenna wire with the communication electronics.

The disclosure provides a few embodiments for creating, designing, and manufacturing an antenna system in accordance with the present invention. Upon reading this disclosure, those of skill in the art will appreciate still additional alternative methods and designs for an antenna system in accordance with the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. An antenna system comprising:
    a first portion of the antenna system wherein the first portion of the antenna system resides on a printed circuit board comprising electronic circuitry; and
    a second portion of the antenna system, wherein the second portion of the antenna system is configured in a different geometric space than the first portion of the antenna system, the first portion and the second portion comprising an antenna loop.

2. The antenna system in claim 1, wherein the antenna loop is substantially closed.

3. The antenna system in claim 1, wherein the first portion of the antenna loop comprises an antenna wire.

4. The antenna system in claim 1, wherein the first portion of the antenna loop is etched on the printed circuit board.

5. The antenna system in claim 4, wherein the second portion of the antenna loop is an antenna wire.

6. The antenna system in claim 1, wherein the second portion of the antenna loop is substantially parallel to the first portion of the antenna loop.

7. The antenna system in claim 1, wherein the antenna loop is configured within a confined space.

8. The antenna system in claim 7, wherein the confined space comprises an internal portion of one from the group comprising a cordless mouse, a cordless joystick, and a cordless video camera.

9. The antenna system in claim 8, wherein the internal portion comprises a volume of approximately 6 to 10 centimeters by 2 to 5 centimeters by 2 to 4 centimeters.

10. The antenna system in claim 1, wherein the antenna loop either transmits or receives radio frequency signals.

11. The antenna system in claim 10, wherein the radio frequency signals are in a range of substantially up to 100 MHz.

12. The antenna system in claim 1, wherein at least one of the first portion or the second portion of the antenna system includes a plurality of turns.

13. An antenna system configured within a confined space, comprising:

a first portion of the antenna system, the first portion etched on a printed circuit board comprising electronic circuitry; and a second portion of the antenna system, the second portion including an antenna wire and in a different geometric space than the first portion;

wherein the first portion and the second portion are configured in an antenna loop.

14. The antenna system in claim 13, wherein the antenna loop is substantially closed.

15. The antenna system in claim 13, wherein the second portion is substantially parallel to the first portion.

16. The antenna system in claim 13, wherein the second portion further comprises being etched on a second printed circuit board.

17. The antenna system in claim 13, wherein the antenna system either transmits or receives radio frequency signals of less than substantially 100 MHz.

18. The antenna system in claim 13, wherein the confined space comprises an internal portion of one from the group comprising a cordless pointing device, a cordless gaming controller, and a cordless camera device.

19. The antenna system in claim 18, wherein the internal portion comprises a volume of approximately 6 to 10 centimeters by 2 to 5 centimeters by 2 to 4 centimeters.

20. The antenna system in claim 13, wherein at least one of the first portion or the second portion includes a plurality of turns.

21. A method for designing an antenna system for either transmitting or receiving a radio frequency signal of substantially less than 100 MHz in a device having a confined space, comprising:

etching a first portion of the antenna system on a printed circuit board comprising electronic circuitry; and coupling a second portion of the antenna system in a geometric space apart from the first portion to form an antenna loop.

22. The method in claim 21, wherein the second portion of the antenna loop is either substantially parallel to the first portion or substantially perpendicular to the first portion.

23. The method in claim 21, wherein the antenna loop is substantially closed.

* * * * *

UNITED STATES PATENT AND TRADEMARK OFFICE
CERTIFICATE OF CORRECTION

PATENT NO. : 6,356,243
DATED : March 12, 2002
INVENTOR(S) : Gerhard Schneider and Philippe Junod It is certified that error appears in the above-identified patent and that said Letters Patent is hereby corrected as shown below:

Title page,
Item [57] ABSTRACT, line 12, replace "gaining device" with -- gaming device --.

Signed and Sealed this

Twenty-first Day of May, 2002

*Attest:*

JAMES E. ROGAN
*Attesting Officer*     *Director of the United States Patent and Trademark Office*